Oct. 29, 1968            A. L. MILLER            3,408,004
AUTOMATICALLY CONTROLLED HEATING SYSTEM
Filed Feb. 20, 1967
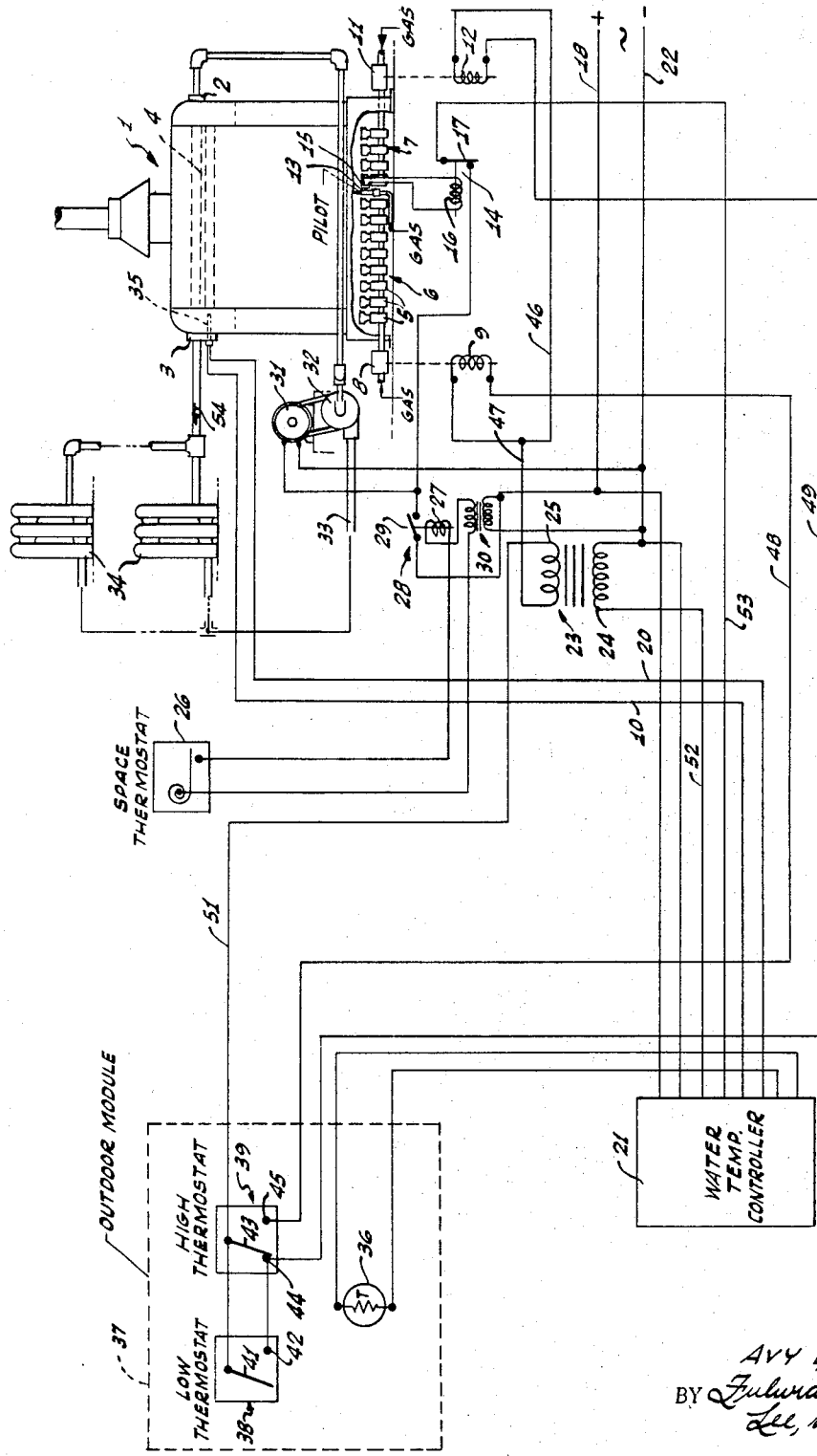
INVENTOR.
AVY L. MILLER
BY Fulwider, Patton, Rieber
Lee, and Utecht
ATTORNEYS

United States Patent Office 3,408,004
Patented Oct. 29, 1968

3,408,004
AUTOMATICALLY CONTROLLED HEATING SYSTEM
Avy L. Miller, North Hollywood, Calif., assignor to Teledyne, Inc., Los Angeles, Calif., a corporation of Delaware
Filed Feb. 20, 1967, Ser. No. 617,363
5 Claims. (Cl. 236—9)

ABSTRACT OF THE DISCLOSURE

A space-heating system using forced circulation of hot water in which the supply water is brought up to temperature by burners operated in sections, the number of burners operating at a given time being controlled by the level of the outdoor temperature. The temperature level at which the hot water is supplied may also be varied inversely with the level of the outdoor temperature.

Cross-reference to related application

There is no pending application to which the present invention is related.

Background of the invention (1) The present invention is directed to a system for space heating by forced circulation of hot water from a central water heater to space-heating units, as called for by thermostatic control at the space being heated. The system is regulated by the outdoor temperature to deliver a variable heat input to the water whose temperature may also be varied to the end of securing an even flow of heat as required.

(2) Space-heating systems are designed with a capacity to supply the maximum expected heating load at the lowest outdoor temperature. The heat input to the supply water at maximum capacity will take care of this maximum heating load when operated continuously and at lower heating loads the heater will be cycled or operated intermittently with the same input while operating. Attempts to lower heat input by reducing the flame require complex and expensive burner constructions or a serious loss in efficiency of fuel consumption results.

The present invention lessens the frequency of cycling and possible overrun of hot water temperature by operating the heater burners in sections, with the number of burners operating at a given time controlled by the outdoor temperature. The heat input is thereby reduced in conformance with lower heating load but the burners in operation are at their designed full-flame condition. The system provides capacity control by selecting the correct heater firing rate in accordance with the outdoor temperature level.

The flow of heat is further evened by reducing the temperature of the supply water as the outdoor temperature rises. This reduces the amount of heat present in and which can be abstracted from the circulating water and avoids flow modulation and return water mixing systems which have heretofore been employed.

Summary of the invention

The primary object of the present invention is to secure an even flow of heat to a space to be heated in both domestic and commercial installations where forced circulation of hot water is used as the heating medium. It is a further object of the invention to eliminate intermittent blasts of hot air where an air flow heat exchanger is employed to extract heat from a water coil, and in general to prevent up and down swings in room or space temperature.

Since the maximum heating capacity of the supply water heater is designed to supply the maximum heating load, it is desired that the heat input to the heater be changed inversely with the outdoor temperature level and directly with the heating requirement in the space to be heated, to avoid rapid cycling of the burners and large overruns in the temperature of the supply water. In the system according to the present invention, the burners for a single water heater are divided into sections and the number of burners operating at a given time when heat input is called for is controlled by the level of the outdoor temperature. This sectionalizing of the burners of the water heater may be carried out to any desired degree and the burners called into use in increasing numbers as the outdoor temperature falls.

While control of the heater firing rate inversely to the level of the outdoor temperature is a desirable inventive feature in itself, the system may desirably also vary the temperature of the supply water inversely to the level of the outdoor temperature to further even the flow of heat to the space being heated. The water temperature is preferably regulated to supply the heat required at a low level without intermittent, very hot surges of heat in the space being heated. A practical example is to lower the water temperature one-half a degree for each degree of elevation of the outdoor temperature.

The combination of both firing rate control and water temperature control in the system of this invention provides optimum even flow of heat to the space being heated.

Brief description of the drawing

The single figure of the drawing is a diagrammatic representation of a space-heating system according to the present invention.

Description of the preferred embodiments

In the preferred embodiment of the invention selected for illustration in the drawing there is shown a water heater 1 having a return water inlet 2 and a supply water outlet 3 with heating tubes 4 within the fire box of the heater heated by the flames from burners 5. This water heater may be of the type shown in applicant's Patent No. 2,828,723. The burners 5 may be grouped into any desired number of sections, here shown as two sections 6 and 7, the burners in section 6 being double the number of burners in section 7. The supply of gas or other fuel to the burners in section 6 is under the control of a valve 8 operated by a solenoid coil 9. The supply of gas to the burners in section 7 is controlled by a valve 11 operated by a solenoid coil 12. Both sections of burners are ignited from a pilot flame 13 having a conventional safety device 14 including a flame-sensing generator 15 energizing a coil 16 controlling a safety contact 17.

The electrical supply for the system is from lines 18 and 22. A voltage lowering control circuit transformer 30 has its primary coil connected across lines 18 and 22 and its secondary coil connected through a room or space thermostat 26 to the operating coil 27 of a relay 28 whose contact 29 connects motor 31 across the lines 18 and 22. The motor 31 drives a water circulating pump 32 in a heating loop 33 between the hot water supply outlet 3 and the return water inlet 2 and including space-heating heat enchange devices 34 therein which may be direct or baseboard radiators, radiant panels, forced air-water coil heat exchangers or any other type of heating unit utilizing circulating hot water as the heating medium.

A second voltage lowering control circuit transformer 23 has its primary coil 24 connected directly to supply line 22 and connectable to supply line 18 through line 52, water temperature controller 21, line 53, safety switch contact 17 and pump relay contact 29. Thus pump 32 must be operating and the controller 21 be calling for heat input before transformer 23 is energized. The secondary coil 25 of transformer 23 connects to lines 47 and 51. Line 47 connects to line 46 which feeds to one side of each of the solenoid valve coils 9 and 12. The opposite sides of coils 9 and 12 are connected, respectively, to lines 48 and 49.

Adjacent the hot water supply outlet 3 is a temperature-responsive element 35 which in a variable water temperature system operates inversely with a like temperature-responsive element 36 in an outdoor module 37. The elements 35 and 36 may be included in a bridge circuit or the like within the water temperature controller 21, the details of which form no part of the present invention, to regulate the temperature of the water at the heater outlet.

When a constant temperature supply water system is used, the element 35 can be a simple thermostat, lines 10 and 20 thereto be connected directly to lines 52 and 53, and element 36 and water temperature controller 21 omitted from the system.

Within the outdoor module 37 are a pair of thermostatic switches 38 and 39 which preferably have adjustable operating points. Switch 38 has a movable contact 41 and a stationary contact 42, the switch being normally open and closing with decreasing temperature. Switch 39 has a movable contact 43 and stationary contacts 44 and 45 and operates so that one of contacts 44, 45 is closed at all times. Contact 43 engages contact 44 at temperatures higher and contact 45 at temperatures lower than the switch setting. Line 51 to the transformer secondary 25 connects to both movable contacts 41 and 43. Line 48 connects to stationary contact 45. Line 49 connects to both stationary contacts 43 and 44.

The operation of the space-heating system according to the present invention is as follows: When the temperature in the space to be heated falls below the setting of the space thermostat 26 its contacts close to energize the coil 27 of the relay 28 which closes its contact 29. This energizes motor 31 to drive pump 32 and circulate water through the heating loop including the space heaters 34 in the direction of the arrow 54. The thermostatic switches 38 and 39 may be set to operate at any desired temperatures, for example switch 38 closing contact 42 at an outdoor temperature of 28° F., and switch 39 opening contact 45 and closing contact 44 when the temperature is above 50° F. and vice versa. The thermostatic switches 38 and 39 are shown in the drawings in their positions for an outdoor temperature above 50° F.

When the temperature-responsive device 35 senses a supply water temperature below the value at which it is to be maintained, either a thermostatic switch 35 directly closes the circuit through lines 52 and 53 in the case of a fixed temperature water supply, or, in the case of a varying supply temperature, a thermistor 35 unbalances thermistor 36 circuit so that water temperature controller 21 closes the circuit through lines 52 and 53, to energize the primary 24 of transformer 23. The transformer secondary 25 now energizes the solenoid valve coil 12 through lines 47 and 46 to one side and through line 49, contacts 44 and 43 and line 51 to the other side. Valve 11 now opens to energize the one-third burner section 7 which ignites to supply a minimum amount of heat to the water passing through the heat exchange tubes 4. Solenoid valve coil 9 is not energized since its circuit must be completed through line 48 and contact 45 which is now open.

At any time during operation that the space being heated comes up to the desired temperature, the space thermostat 26 is satisfied and opens to deenergize relay 28 and open contact 29 to deenergize both motor 31 and the solenoid valve circuits.

At any time during the heating cycle that the temperature of the supply water exceeds the temperature to which it is to be regulated the circuit through lines 52 and 53 is opened, deenergizing transformer 23 which in turn deenergizes the solenoid valve circuits.

It will therefore be seen that with the outdoor temperature above the setting of the thermostatic switch 39, in the example cited 50° F., heat is supplied to the water heater 1 and the water passing therethrough from only a one-third section of the burners indicated at 7. Use of a smaller number of burners operating individually at normal capacity reduces the heat input into the water heater when the heating load is low so that on-off cycling of the heating system is reduced and the possibility or extent of overrun of supply water temperature is likewise reduced.

If the outdoor temperature should drop below 50° F. (but remain above 28° F.) contact 44 is opened and contact 45 closed while contact 42 remains open. Now, when the temperature of the water sensed at 35 calls for heat input, transformer 23 is energized and energizes solenoid valve coil 9 through now closed contact 45 while the solenoid valve coil 12 is deenergized at open contacts 44, 42. The water heater now operates with an intermediate heat input from the two-third burner section 6 to supply the increased heating load resulting from the lower outdoor temperature. Operation with only the two-third burner section 6 when the outdoor temperature is between 28° F. and 50° F. likewise reduces cycling of the heating system and the possibility and extent of water temperature overrun.

Should the outdoor temperature drop below 28° F., thermostatic switch 38 operates to close contact 42 and the next time heat is called for by the water temperature sensor 35, both of the solenoid valve coils 9 and 12 are energized so that all of the burners operate to supply maximum heat to the water heater. With the outdoor temperature below 28° F., the system will be supplying maximum heating load and heat input at full burner capacity of both sections 6 and 7 if desired. Solenoid valve coil 9 is again energized through now closed contact 45 while solenoid valve coil 12 is energized through now closed contact 42 and movable contact 41.

When the water temperature controller 21 and the outdoor temperature sensor 36 are used in the system, dropping of the outdoor temperature will continuously elevate the temperature to which the supply water is regulated as sensed by a water temperature sensing thermistor 35 and compared to the outdoor thermistor 36, in the controller 21. An example of the variable temperature operation would be to make an initial setting whereby at a 50° F. outdoor temperature, the supply water would be regulated to a temperature of 120° F. With the outdoor temperature at 28° F. the supply water temperature would be regulated to a temperature of 131° F. Likewise, if the outdoor temperature should rise to 60° F., the supply water would be regulated to a temperature of 115° F.

It will therefore be seen that the space-heating system according to the present invention provides for heat input into the water heater supplying the system in fractions of the total capacity input under the control of the outdoor temperature. The higher the outdoor temperature the less the heat input to reduce cycling of the heating system and the possibility and extent of overrun of the water supply temperature. The burners of the water heater are operated at full capacity but are divided into sections which are independently controlled to supply heat to the water heater in successive capacity steps dictated by the level of the outdoor temperature. The space-heating load is thereby met with minimum cycling of the heating system and substantially no overrun of the supply water temperature.

While capacity control with variable heat input is of itself a desirable and inventive system for the even flow of heat, this flow may be further evened by the new combination system which also varies the temperature to which the supply water is regulated inversely to the outdoor temperature so that the higher the outdoor temperature the lower the temperature of the water supplied to the space heaters. This promotes a more even flow of heat for the lower heating loads by supplying continued lower temperature inputs rather than short, hot surges and blasts with attendant large up and down swings in the space temperature. The system overall provides for efficient operation with more even heat flow and more constant temperature in the space being heated.

While certain preferred embodiments of the invention have been specifically illustrated and described it is to be understood that the invention is not limited thereto as many variations will be apparent to those skilled in the art and the invention is to be given its broadest interpretation within the terms of the following claims.

I claim:

1. In a space-heating system utilizing circulating hot water to convey heat from a water heater to space-heating units:
    a water heater having a heat exchanger therein through which the heating water flows;
    a plurality of burners for supplying heat to said heat exchanger;
    means connecting said burners together into independently controlled sections;
    means for independently supplying fuel to each of said sections;
    means for circulating water through said heat exchanger and space-heating units whenever heat is called for in the spaces being heated;
    means responsive to the water temperature for initiating circuits controlling said means supplying fuel to said burner sections to supply fuel thereto; and
    thermostatic means responsive to the outdoor temperature and operating in response to the level thereof to complete the control circuits to said fuel supplying means to supply fuel substantially to only enough burners to furnish heat inputs sufficient to meet changer and space-hating units whenever heat is the heating load requirements corresponding to the outdoor temperature level.

2. The space-heating system defined in claim 1 including:
    means responsive to the outdoor temperature operating to vary the temperature to which the heated water is regulated inversely to the level of the outdoor temperature.

3. The space-heating system defined in claim 1 in which:
    said burner being divided into two sections of unequal numbers of burners;
    a pair of thermostatic switches responsive to the outdoor temperature,
    one of said thermostatic switches being set to operate at a predetermined higher temperature and operating when the outdoor temperature is above said predetermined higher temperature to set up a circuit to supply fuel only to the smaller burner section and when said outdoor temperature is below said predetermined higher temperature to set up a circuit to supply fuel to only the larger burner section,
    and said second thermostatic switch operating at a predetermined lower temperature to set up the circuit to supply fuel to said smaller burner section, whereby at temperature below said predetermined lower temperature all of the burners operate to supply maximum heat input to the water heater.

4. The space-heating system defined in claim 1 in which said heater burners are divided into two sections of substantially one-third and two-third the total number of burners;
    a first solenoid valve controlling the flow of heat to the one-third burner section;
    a second solenoid valve controlling the flow of fuel to the two-third burner section;
    thermostatic means responsive to higher and lower outdoor temperature settings;
    circuits for said solenoid valves controlled by said outdoor thermostatic means and including a first circuit to said first thermostatic valve completed when the outdoor temperature is above said higher outdoor temperature setting;
    a second circuit for said first solenoid valve completed when said outdoor temperature is below the lower outdoor temperature setting;
    and a circuit for said second solenoid valve completed when said outdoor temperature is below the higher outdoor temperature setting.
    said solenoid valve circuits being finally closed in response to the sensing of a low temperature at said means responsive to water temperature to supply fuel to the section of burners dictated by the outdoor temperature,
    whereby the first solenoid valve only is energized when the outdoor temperature is above the higher outdoor temperature setting, the second solenoid valve alone is energized when the outdoor temperature is between the lower and higher outdoor temperature settings and both of said solenoid valves are energized when the outdoor temperature is below the lower outdoor temperature setting.

5. The space-heating system defined in claim 4 including:
    means for sensing the outdoor temperature;
    and a controller comparing the means for sensing the outdoor temperature and the means responsive to water temperature to call for the supply of heat to the water heater at a variable water temperature sensed by said means responsive to water temperature but whose level is controlled inversely to the outdoor temperature by the sensing means responsive thereto so as to regulate to a lower supply water temperature as the outdoor temperature increases.

References Cited

UNITED STATES PATENTS

| | | | |
|---|---|---|---|
| 2,549,952 | 4/1951 | Wheelock | 236—91 |
| 2,700,505 | 1/1955 | Jackson | 236—9 |
| 2,848,588 | 8/1958 | Hackman | 236—1 |
| 3,007,024 | 10/1961 | Hensen | 236—1 |
| 3,201,045 | 8/1965 | Davidson | 237—8 |
| 3,211,373 | 10/1965 | Miller | 236—20 |

EDWARD J. MICHAEL, *Primary Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,408,004                                                                October 29, 1968

Avy L. Miller

It is certified that error appears in the above identified patent and that said Letters Patent are hereby corrected as shown below:

Column 5, line 34, cancel "changer and space-hating units whenever heat is".

Signed and sealed this 17th day of March 1970.

(SEAL)
Attest:

Edward M. Fletcher, Jr.

Attesting Officer

WILLIAM E. SCHUYLER, JR.

Commissioner of Patents